United States Patent
Tongue et al.

(10) Patent No.: US 6,863,711 B2
(45) Date of Patent: Mar. 8, 2005

(54) TEMPERATURE SWING HUMIDITY COLLECTOR USING POWERPLANT WASTE HEAT

(75) Inventors: Stephen Tongue, Hampden, MA (US); Douglas Snowdon, Somers, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/313,166

(22) Filed: Dec. 6, 2002

(65) Prior Publication Data
US 2004/0107832 A1 Jun. 10, 2004

(51) Int. Cl.$^7$ .......................... B01D 53/04; B01D 53/26
(52) U.S. Cl. ................... 95/10; 95/11; 95/114; 95/126; 95/288; 96/111; 96/122; 96/127; 96/130; 96/146
(58) Field of Search ................... 95/10, 11, 26, 95/114, 115, 117, 126, 288; 96/111, 115, 122, 130, 126–128, 146

(56) References Cited

U.S. PATENT DOCUMENTS

| | | | | |
|---|---|---|---|---|
| 1,661,104 A | * | 2/1928 | Barnebey | 96/146 |
| 2,071,868 A | | 2/1937 | Von Lude | |
| 2,138,689 A | * | 11/1938 | Altenkirch | 95/115 |
| 2,450,289 A | * | 9/1948 | Marek | 422/120 |
| 3,224,168 A | * | 12/1965 | Gregory | 96/146 |
| 3,296,773 A | * | 1/1967 | Hemstreet | 95/114 |
| 3,304,696 A | * | 2/1967 | McKenna | 96/126 |
| 3,400,515 A | * | 9/1968 | Ackerman | 96/118 |
| 3,683,591 A | * | 8/1972 | Glav | 95/93 |
| 3,731,458 A | * | 5/1973 | McGrath, Jr. | 95/123 |
| 3,768,232 A | * | 10/1973 | Farber et al. | 95/106 |
| 3,834,125 A | * | 9/1974 | Richter, Jr. | 96/146 |
| 3,889,742 A | | 6/1975 | Rush et al. | |
| 4,185,969 A | * | 1/1980 | Bulang | 95/120 |
| 4,219,341 A | * | 8/1980 | Hussmann | 96/127 |
| 4,285,702 A | * | 8/1981 | Michel et al. | 95/124 |
| 4,299,599 A | * | 11/1981 | Takeyama et al. | 96/122 |
| 4,304,577 A | * | 12/1981 | Ito et al. | 96/127 |
| 4,377,398 A | * | 3/1983 | Bennett | 96/146 |
| 4,655,802 A | * | 4/1987 | Jaumann | 96/146 |
| 4,898,599 A | | 2/1990 | Settlemyer | |
| 5,106,512 A | * | 4/1992 | Reidy | 210/744 |
| 5,141,531 A | | 8/1992 | Parrish | |
| 5,149,446 A | * | 9/1992 | Reidy | 210/744 |
| 5,725,639 A | * | 3/1998 | Khelifa et al. | 96/112 |
| 5,846,296 A | * | 12/1998 | Krumsvik | 95/115 |
| 6,117,211 A | * | 9/2000 | Chan et al. | 95/120 |
| 6,336,957 B1 | * | 1/2002 | Tsymerman | 95/115 |
| 6,511,525 B2 | * | 1/2003 | Spletzer et al. | 95/41 |
| 6,630,012 B2 | * | 10/2003 | Wegeng et al. | 95/106 |
| 6,652,628 B1 | * | 11/2003 | Hess | 95/113 |
| 2002/0148221 A1 | | 10/2002 | Jagtoyen | |

FOREIGN PATENT DOCUMENTS

| | | |
|---|---|---|
| DE | 35 25 237 | 1/1987 |
| DE | 198 43 286 | 3/2000 |
| GB | 2281229 A * | 1/1995 |
| WO | WO 02/087730 | 11/2002 |

OTHER PUBLICATIONS

International Search Report dated May 6, 2004.

* cited by examiner

Primary Examiner—Robert H. Spitzer
(74) Attorney, Agent, or Firm—Carlson, Gaskey & Olds

(57) ABSTRACT

A system for recovering water from the atmosphere includes water sorbent assembly composed of a water adsorbent material and a heat exchanger. The water adsorbent material traps water present within the air drawn through the sorbent assembly. Once the sorbent assembly is fully saturated, exhaust gases generated from a power plant are routed through a heat exchanger in thermal contact with the water adsorbent material to remove water within the sorbent assembly into a condenser, and from the condenser to a water storage container.

25 Claims, 1 Drawing Sheet

TEMPERATURE SWING HUMIDITY COLLECTOR USING POWERPLANT WASTE HEAT

BACKGROUND OF THE INVENTION

This invention generally relates to a method and device for recovering water from atmospheric air and specifically to a method and device for recovering water from atmospheric air using power-plant waste heat to remove water accumulated within a water adsorbent device.

There is currently a requirement and desire to provide a water recovery system on military vehicles for supplying water during field operations. Supplying personnel in the field is a difficult and resource consuming task. Water is one of the largest and most important items for re-supply to personnel in the field. As appreciated, this re-supply takes on greater importance in desert climates. For this reason, the armed forces have been investigating devices for reclaiming or recovering moisture from the atmosphere and storing that moisture for use during operations in the field.

It is currently known in the art to utilize devices that recover moisture produced during combustion from an exhaust stream. Such devices recover the moisture exhausted from the vehicle's power plant, and attempt to purify this moisture as potable water. This water vapor expelled during the combustion process includes many exhaust gases. Attempts to recover drinking water directly from exhaust gases of vehicles have been unsuccessful due to the level of impurities contained within typical exhaust gases.

Another known system is to condense moisture from the atmosphere. The technical problem presented by condensing humidity or moisture from the atmosphere is that great amounts of energy are required. Typically, the power for the refrigeration system in low humidity environments is prohibitive. Further, additional systems increase maintenance and repair costs and efforts. Such a system is unattractive for military vehicles based on the size and power required.

Accordingly, it is desirable to develop a system and method for recovering water from atmospheric air that does not require additional power systems and minimizes water purification requirements.

SUMMARY OF THE INVENTION

This invention is a method and device for recovering water from the atmosphere using power plant waste heat for driving water from a water adsorbent bed.

The sorbent bed adsorbs moisture from the atmosphere until saturated with water. Water adsorbed within the adsorbent bed is driven from the adsorbent bed using waste heat produced by the power plant, for example that of a motor vehicle. Waste heat from the power plant of the motor vehicle typically attains temperatures sufficient to remove water from the sorbent bed. The water adsorbent beds include water adsorbent material intermixed between heat exchange passages. The exchange passages are in thermal communication with the exhaust gases generated by the motor vehicle powerplant. The exhaust gases at no time directly contact the water adsorbent material. Therefore, the exhaust gases and the noxious elements contained within the exhaust gases never intermix with water recovered from the atmospheric air. This eliminates any need to eliminate noxious elements from the water as is required in prior art devices that seek to recover water vapor from the combustion process.

Accordingly, the method and device of this invention provides a compact efficient and clean method of recovering water from air with minimized need for purification and using existing energy generated from the motor vehicle power plant.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
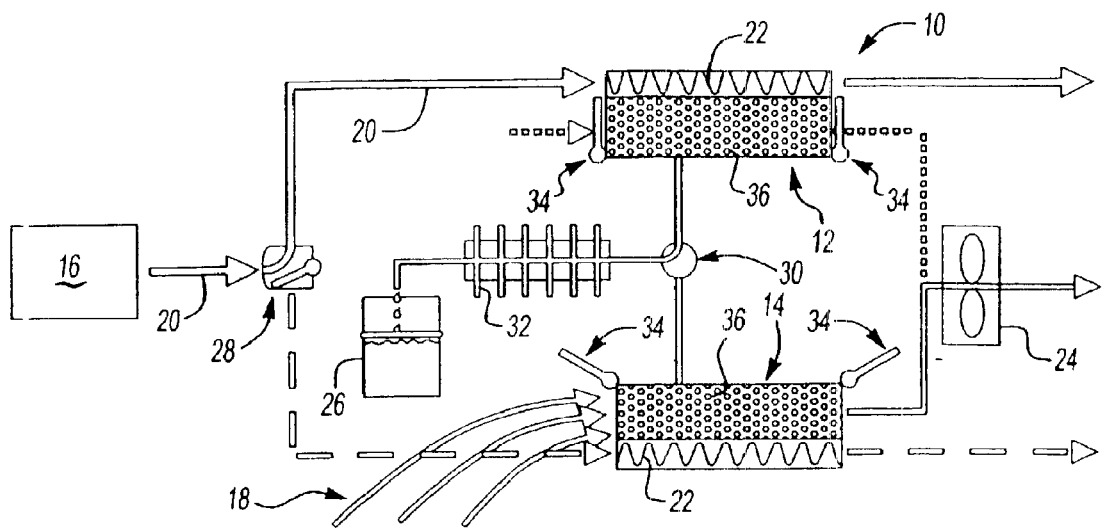
FIG. 1 is a schematic drawing of a water recovery system configured for adsorption of water by a water sorbent assembly.
Figure 2:
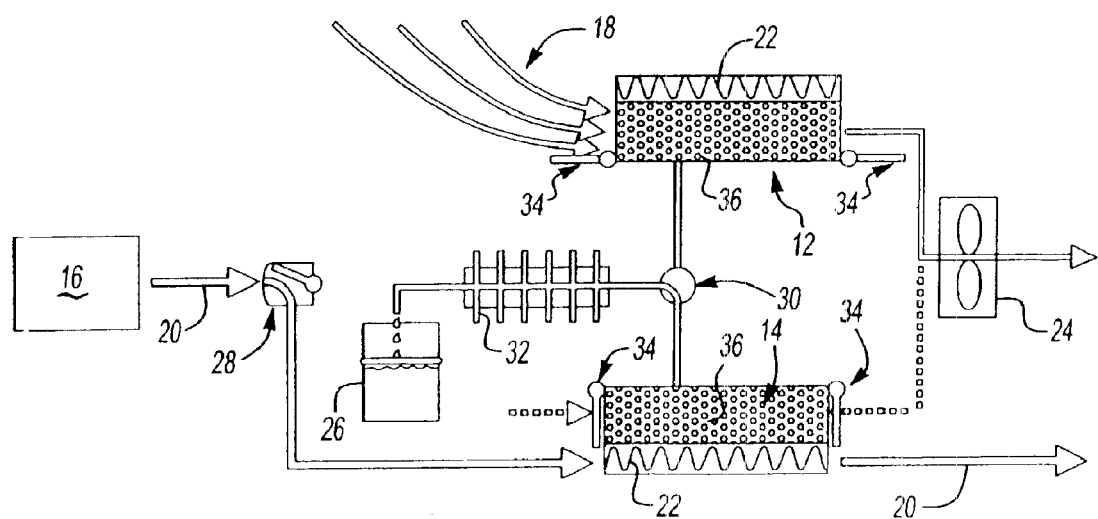
FIG. 2 is a schematic drawing of a water recovery system configured for desorbing of water from the first water sorbent assembly.
Figure 3:
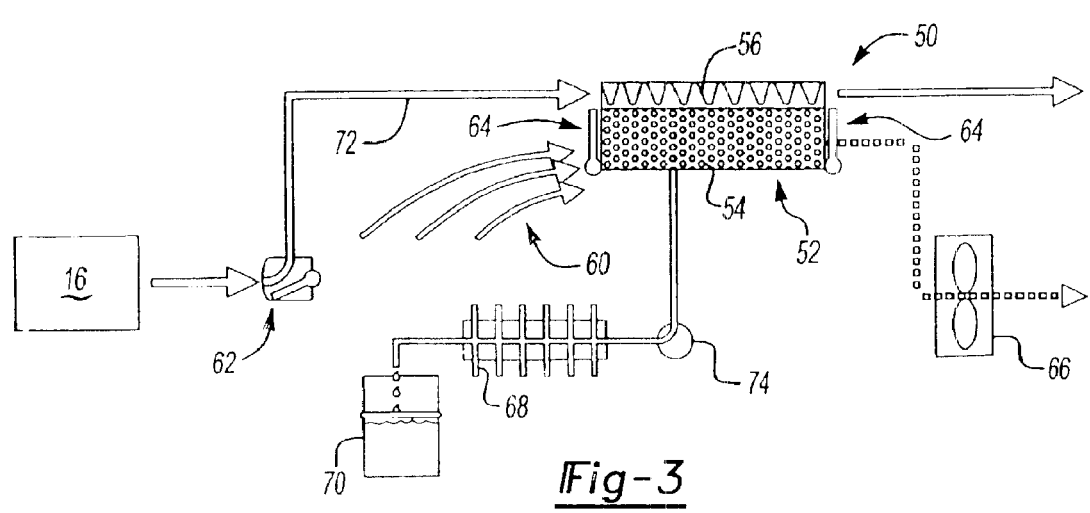
FIG. 3 is a schematic view of another embodiment of the water recovery system including a single sorbent assembly.

FIGS. 1, 2 and 3 are schematics of water collecting system operation. FIGS. 1 and 2 show a two-sorbent bed system that alternates between each sorbent bed between adsorb and desorb positions in cyclic operation. FIG. 3 shows a single sorbent bed operation where humidity is adsorbed then desorbed in a batch process. Either embodiment effectively produces water from ambient air using vehicle power plant waste heat and the number of beds chosen is a function of application specific performance requirements.

FIG. 1 illustrates a system 10 for recovering water from the atmospheric air. The system 10 includes a first sorbent bed 12 in a desorbing position and a second sorbent bed 14 in an adsorbing position. Each of the sorbent beds 12,14 includes a quantity of water adsorbing material 36. The water adsorbing material 36 may be of any type known to a worker skilled in the art such as silica gel, molecular sieves and any other known adsorbent materials. Preferably, the water adsorbing material 36 is selected based on the specific application and environmental conditions in which the system 10 is operated. As appreciated, different types of adsorbing material 36 operate more efficiently in different environmental conditions. Further, the selection of water adsorbent material 36 is also dependent on the amount of energy available to desorb and remove water from each of the sorbent beds 12,14.

The system 10 includes the water sorbent bed 14 in communication with atmospheric airflow, indicated at 18. As atmospheric air 18 is drawn through the sorbent bed 14, any moisture or humidity present within that air is drawn and trapped within the adsorbent material 36 of the sorbent bed 14. Preferably, the sorbent beds 12,14 are configured within a housing in order to maximize the amount of water that can be recovered from atmospheric air 18. An air circulation fan 24 aids in drawing atmospheric air through the sorbent bed 14. As appreciated, air circulation ducts and venting required to drive atmospheric air 18 through the sorbent bed 14 is application specific and depends on the specific configuration of the system 10, along with specific vehicle configuration.

Each sorbent bed 12,14 can communicate with ambient condenser 32. Once the adsorbent material 36 within each of the sorbent beds 12, 14 has been saturated to a point where water can no longer be adsorbed, valve 30 is opened to place the sorbent bed 14 in communication with the condenser 32.

The system 10 includes an exhaust circuit originating from a power plant 16 that provides exhaust gases indicated by the arrow 20 to each sorbent bed 12,14. The first sorbent bed 12 is configured to receive exhaust gases 20 to drive accumulated water from the adsorbent material 36. Temperatures of exhaust gases are typically greater than 500° F. Each sorbent bed 12, 14 includes a heat exchanger 22. The heat exchanger 22 is in thermal communication with the water adsorbent material 36 within each of the sorbent beds 12, 14. The heat exchanger 22 isolates the exhaust gases 20 from the water adsorbent material 36 such that none of the noxious elements contained within the exhaust gases 20 is intermixed with water vapor recovered from the atmosphere. The heat exchanger 22 within each of the sorbent beds 12,14 provides the thermal energy required to drive water and moisture from the adsorbent material 36. In this way, thermal energy that is otherwise simply vented to atmosphere is reclaimed and used in the water reclamation process.

In operation, the water recovery system 10 accumulates water present within the atmosphere by first drawing atmospheric airflow indicated at 18 is through the sorbent bed 14 and through the water adsorbent material 36. The fan 24 pulls atmospheric air 18 through the sorbent bed 14. Initially, this airflow serves to reduce the temperature of the adsorbent to ambient conditions. As appreciated, appropriate ductwork provides a flow path for sufficient quantities and flows of atmospheric air through the sorbent bed 14. Airflow valves 34 control airflow 18 to the sorbent beds 12, 14. The airflow valves 34 are illustrated schematically and may be of any type that is currently known to a worker skilled in the art. Preferably, the air valves 34 are flaps that direct and control airflow through appropriately configured ductwork. Note that it is within the contemplation of this invention that any ductwork or airflow passages as is known by a worker skilled may be used with this invention.

Airflow 18 is driven through the sorbent bed 14 until the sorbent bed 14 can no longer adsorb water or has reached a saturated state. The amount of time that the sorbent bed 14 is exposed to airflow 18 is dependent on the specific water adsorbing material 36 composing the sorbent bed 14 and prevailing environmental conditions. As appreciated, different types of adsorbing material 36 will have different saturation levels at which the efficiency of water absorption dramatically decreases. Once the sorbent bed 14 has been saturated, the air valves 34 will be closed to prevent additional airflow 18 through that bed.

Referring to FIG. 2, once the sorbent bed 14 has been saturated, it is switched over to a desorbing position or configuration. In the desorbing position, the air flaps 34 are closed to restrict or completely shut off atmospheric airflow 18 to the sorbent bed 14. An exhaust valve 28 controlling the flow of exhaust gases 20 is opened allowing exhaust gases flow through the heat exchanger 22 of the sorbent bed 14. Outlet valve 30 opens and directs flow of water from the sorbent bed 14 to the condenser 32. The heat generated from the exhaust gases 20 drives water from the adsorbent material 36 and into the condenser 32.

The condenser 32 condenses moisture into liquid that is then deposited into a storage container 26. The condenser 32 is preferably an ambient type condenser that does not use refrigerants to condense water from gas into liquid. The use of an ambient condenser 32 eliminates the need for a supporting refrigerant system in favor of using the cooling effects of airflow to condense water vapors into liquid.

In this embodiment, two sorbent beds 12,14 are illustrated. One of the sorbent beds 12,14 is adsorbing moisture from atmospheric airflow 18 and the other is undergoing a desorbing process. As appreciated, although two sorbent beds 12, 14 are shown, a number of sorbent beds can be used within the system 10. The number of sorbent beds is dependent on application specific requirements. The longer the desorbing process, the more sorbent beds that may be used, such that, water is always being recovered from the atmosphere and always being reclaimed from the sorbent bed by using the exhaust gases 20 from the motor vehicle power plant 16.

Referring to FIG. 3, another embodiment of a system for recovering water from the atmospheric air is generally indicated at 50 and includes a single sorbent bed 52. The single sorbent bed 52 includes a quantity of water adsorbing material 54. The water adsorbing material 54 is in thermal contact with the heat exchanger 56. In operation, the system 50 with the single sorbent bed 52 uses a batch process for recovering water from atmospheric air 60. The system 50 operates by first adsorbing water and moisture from the atmospheric airflow 60 for a desired period, or until saturated, and then desorbed. During the adsorbing period, the air valves 64 would be open to expose the water adsorbent material 54 to atmospheric airflow 60. During this time, the air circulation fan 66 draws airflow 60 through the sorbent bed 52. Once the sorbent bed has been fully saturated with moisture and water, the flaps 64 close, as is shown in FIG. 3 and the gas inlet valve 62 opens to exhaust gases indicated at 72 that flow through heat exchanger 56. The exhaust gases 72 are of such a temperature as to drive the water from the water adsorbent material 54 through an outlet valve 74 into condenser 68. From the condenser 68 liquid is deposited within a liquid storage container 70.

The specific size of each of the sorbent beds is dependent on application specific requirements and is selected in view of the environmental conditions including mean temperatures, dew point, prevailing temperature variations along with other known environmental characteristics of the climate in which the system will operate. The larger the sorbent bed, the more water that can be adsorbed. However, the larger the sorbent bed, the greater amount of energy that is required to remove water from that bed and also the longer a duration of time that that bed must be exposed to the elevated temperatures of the exhaust gas in order to drive that water. Further, the temperatures of exhaust gas limit the size of the sorbent bed and the type of adsorbent material used. Temperatures of exhaust gases are typically greater than 500° F.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of recovering water from the atmosphere using power plant waste heat, said method comprising the steps of;
   a. flowing atmospheric air through a water sorbent bed;
   b. adsorbing water from the atmospheric air with the sorbent bed; and
   c. heating the sorbent bed by flowing exhaust gases from the power plant through heat exchanger passages in direct thermal communication with the sorbent bed to remove water from the sorbent bed into a water storage container.

2. The method of claim 1, including the step of closing of atmospheric air flow to the sorbent bed and directing heat from the power plant to the water sorbent bed.

3. The method of claim 1, wherein said step a. includes a fan for circulating atmospheric air through the sorbent bed.

4. The method of claim 1, wherein said step a. includes an ejector for circulating atmospheric air through the sorbent bed.

5. The method of claim 1, wherein said step a. includes power plant suction for circulating atmospheric air through the sorbent bed.

6. The method of claim 1, including multiple sorbent beds, and performing said step b. on a first of the multiple sorbent beds, and performing step c. on another of the multiple sorbent bed concurrently.

7. The method of claim 1, including the step of switching from adsorbing to desorbing the sorbent bed after a predetermined amount of time.

8. The method of claim 1, including the step of switching from adsorbing to desorbing the sorbent bed in response to the sorbent bed being saturated to a predetermined level.

9. The method of claim 1, wherein said power plant is an internal combustion engine and said waste heat is generated from exhaust gases from combustion.

10. A system for recovering water from the atmosphere comprising;
    a water sorbent assembly for adsorbing water from atmospheric air;
    an air inlet for controlling atmospheric airflow through said sorbent assembly;
    an exhaust gas source providing heat for desorbing said sorbent assembly;
    a heat exchanger in thermal communication with said water sorbent assembly for isolating exhaust gases from said water sorbent assembly while transmitting heat for desorbing said sorbent assembly;
    a condenser in communication with an outlet of said sorbent assembly for accumulating water from said sorbent assembly; and
    a container for storing water accumulated by said condenser.

11. The system of claim 10, wherein said sorbent assembly includes water adsorbent material.

12. The system as recited in claim 11, wherein said heat exchanger includes a plurality of passages isolating exhaust gases from said water adsorbent material, wherein said plurality of passages are in thermal communication with said water adsorbent material.

13. The system of claim 10, wherein said heat exchanger includes heat exchange passages in communication with said exhaust gas source.

14. The system of claim 13, including an exhaust gas valve for controlling the flow of exhaust gas from said exhaust source to said heat exchange passages.

15. The system as recited in claim 13, wherein said heat exchanger passages are disposed within said water sorbent assembly.

16. The system of claim 10, wherein said water sorbent assembly includes multiple water sorbent assemblies, wherein one of said multiple sorbent assemblies is in communication with said atmospheric air flow for adsorbing water, and another of said multiple water sorbent assemblies is in communication with said exhaust gas source for desorbing water from said sorbent assembly.

17. The system of claim 10, including a circulation fan for drawing atmospheric air through said sorbent assembly.

18. The system of claim 10, including an ejector for drawing atmospheric air through said sorbent assembly.

19. The system of claim 10, including a power plant suction outlet for drawing atmospheric air through said sorbent assembly.

20. The system of claim 10, including air control valve for controlling the flow of atmospheric air through said sorbent assembly.

21. The system of claim 10, wherein said exhaust gas source is an internal combustion engine.

22. The system of claim 10, installed within a motor vehicle and operable during operation of said motor vehicle.

23. The method as recited in claim 1, wherein said step c. includes isolating the exhaust gases from contact with the water sorbent bed while transferring waste heat from said exhaust gases to remove water from said sorbent bed.

24. A system for recovering water from the atmosphere comprising:
    a water adsorbent material for adsorbing water from atmospheric air;
    an air inlet for controlling atmospheric airflow through said water sorbent material;
    a beat exchanger including a plurality of passages disposed adjacent said water sorbent material for controlling exhaust gas flow adjacent said water sorbent assembly for desorbing water from said water sorbent material; and
    a condenser for accumulating water from said water sorbent material.

25. The system as recited in claim 24, wherein said plurality of passages include an exterior surface for communicating heat from the exhaust gases directly to said water sorbent material.

* * * * *

UNITED STATES PATENT AND TRADEMARK OFFICE
CERTIFICATE OF CORRECTION

PATENT NO.    : 6,863,711 B2
DATED         : March 8, 2005
INVENTOR(S)   : Tongue et al.

It is certified that error appears in the above-identified patent and that said Letters Patent is hereby corrected as shown below:

Column 6,
Line 43, "beat" should read -- heat --.

Signed and Sealed this

Fourteenth Day of June, 2005

JON W. DUDAS
*Director of the United States Patent and Trademark Office*